United States Patent
Hu et al.

(10) Patent No.: US 11,301,732 B2
(45) Date of Patent: Apr. 12, 2022

(54) PROCESSING IMAGE-BEARING ELECTRONIC DOCUMENTS USING A MULTIMODAL FUSION FRAMEWORK

(71) Applicant: Microsoft Technology Licensing, LLC, Redmond, WA (US)

(72) Inventors: Changbo Hu, Fremont, CA (US); Qun Li, Lake Forest Park, WA (US); Ruofei Zhang, Mountain View, CA (US); Keng-hao Chang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

(21) Appl. No.: 16/830,219

(22) Filed: Mar. 25, 2020

(65) Prior Publication Data

US 2021/0303939 A1    Sep. 30, 2021

(51) Int. Cl.
*G06K 9/62* (2006.01)
*G06K 9/00* (2006.01)
*G06K 9/32* (2006.01)
*G06N 3/04* (2006.01)

(52) U.S. Cl.
CPC ....... *G06K 9/6288* (2013.01); *G06K 9/00456* (2013.01); *G06K 9/3241* (2013.01); *G06N 3/0454* (2013.01); *G06K 2209/01* (2013.01); *G06K 2209/25* (2013.01)

(58) Field of Classification Search
None
See application file for complete search history.

(56) References Cited

U.S. PATENT DOCUMENTS

| 10,007,863 | B1 * | 6/2018 | Pereira | G06K 9/6267 |
|---|---|---|---|---|
| 10,846,571 | B2 * | 11/2020 | Joseph | G06K 9/6267 |
| 2018/0137551 | A1 | 5/2018 | Zheng et al. | |
| 2018/0197223 | A1 * | 7/2018 | Grossman | G06Q 30/0621 |
| 2019/0065589 | A1 * | 2/2019 | Wen | G06F 16/35 |
| 2020/0082002 | A1 | 3/2020 | Whitman et al. | |

OTHER PUBLICATIONS

PCT Search and Written Opinion for PCT Application No. PCT/US2021/018273, dated May 10, 2021, 14 pages.
Kiapour, et al, "Brand > Logo: Visual Analysis of Fashion Brands," arXiv:1810.09941v1 [cs.CV], Oct. 23, 2018, 9 pages.
(Continued)

*Primary Examiner* — David Perlman

(57) ABSTRACT

A computer-implemented technique uses one or more neural networks to identify at least one item name associated with an input image using a multi-modal fusion approach. The technique is said to be multi-modal because it collects and processes different kinds of evidence regarding each detected item name. The technique is said to adopt a fusion approach because it fuses the multi-modal evidence into an output conclusion that identifies at least one item name associated with the input image. In one example, a first mode collects evidence by identifying and analyzing regions in the input image that are likely to include item name-related information. A second mode collects and analyzes any text that appears as part of input image itself. A third mode collects and analyzes text that is not included in the input image itself, but is nonetheless associated with the input image.

17 Claims, 10 Drawing Sheets

(56) References Cited

OTHER PUBLICATIONS

Karaoglu, et al., "Con-Text: Text Detection for Fine-grained Object Classification," in IEEE Transactions on Image Processing, vol. 26, No. 8, Aug. 2017, 15 pages.
Kalantidis, et al, "Scalable Triangulation-based Logo Recognition," in Proceedings of ACM International Conference on Multimedia Retrieval (ICMR '11), Apr. 2011, 7 pages.
Bagdanov, et al., "Trademark Matching and Retrieval in Sports Video Databases," in Proceedings of the International Workshop on Workshop on Multimedia Information Retrieval (MIR '07), Sep. 2007, pp. 79-86.
Kleban, et al., "Spatial Pyramid Mining for Logo Detection in Natural Scenes," in Proceedings of IEEE International Conference on Multimedia and Expo, Apr. 2008, 4 pages.
Joly, et al., "Logo Retrieval with A Contrario Visual Query Expansion," in Proceedings of the 17th ACM International Conference on Multimedia, Oct. 2009, pp. 581-584.
Meng, et al., "Interactive Visual Object Search through Mutual Information Maximization," in Proceedings of the 18th ACM International Conference on Multimedia (MM '10), Oct. 2010, pp. 1147-1150.
Romberg, et al., "Bundle Min-Hashing for Logo Recognition," in Proceedings of the 3rd ACM Conference on International Conference on Multimedia Retrieval, Apr. 2013, pp. 113-120.
Ren, et al., "Faster R-CNN: Towards Real-Time Object Detection with Region Proposal Networks," arXiv:1506.01497v3 [cs.CV], Jan. 6, 2016, 14 pages.
Liu, et al., "SSD: Single Shot MultiBox Detector," arXiv:1512.02325v5 [cs.CV], Dec. 29, 2016, 17 pages.
Redmon, et al., "You Only Look Once: Unified, Real-Time Object Detection," arXiv:1506.02640v5 [cs.CV], May 9, 2016, 10 pages.
Zhao, et al., "Object Detection with Deep Learning: A Review," arXiv:1807.05511v2 [cs.CV], Apr. 16, 2019, 21 pages.
Su, et al., "Open Logo Detection Challenge," arXiv:1807.01964v3 [cs.CV], Sep. 27, 2018, 14 pages.
Bianco, "Deep Learning for Logo Recognition," arXiv:1701.02620v2 [cs.CV], May 3, 2017. 10 pages.
Bianco, et al., "Logo Recognition Using CNN Features," in LNCS 9280, Springer International Publishing, ICIAP 2015, Part II, pp. 438-448.
Devlin, et al., "BERT: Pre-training of Deep Bidirectional Transformers for Language Understanding," arXiv:1810.04805v2 [cs.CL], May 24, 2019, 16 pages.
Salton, et al., "Introduction to Modern Information Retrieval," McGraw-Hill, Inc., table of contents only, 1983, 10 pages.
Uijlings, et al., "Selective Search for Object Recognition," in International Journal of Computer Vision, vol. 104(2), 2013, 18 pages.
Redmon, et al., "YOLOv3: An Incremental Improvement," arXiv:1804.02767v1 [cs.CV], Apr. 8, 2018, 6 pages.
Silberman, et al., "TensorFlow-Slim image classification model library," available at https://github.com/tensorflow/models/blob/master/research/slim/README.md, GitHub, accessed on Mar. 5, 2020, 13 pages.
Simonyan, et al., "Very Deep Convolutional Networks for Large-Scale Image recognition," arXiv:1409.1556v6 [cs. CV], Apr. 10, 2015, 14 pages.
"Datasets: FlickrLogos-32 / FlickrLogos-47," available at https://web.archive.org/web/20191002062935/http://www.multimedia-computing.de/flickrlogos, Multimedia Computing and Computer Vision Lab, Augsburg University, via WayBackMachine, Oct. 2019, 5 pages.
Howard, et al., "MobileNets: Efficient Convolutional Neural Networks for Mobile Vision Applications," arXiv:1704.04861v1 [cs.CV], Apr. 17, 2017, 9 pages.
Szegedy, et al., "Rethinking the Inception Architecture for Computer Vision," arXiv:1512.00567v3 [cs.CV], Dec. 11, 2015, 10 pages.
Vaswani, et al., "Attention Is All You Need," arXiv:1706.03762v5 [cs.CL], Dec. 6, 2017, 15 pages.
Li, et al., U.S. Appl. No. 16/422,992, "Pipeline for Identifying Supplemental Content Items That are Related to Objects in Images," filed May 25, 2019, 35 pages.
Hu, et al., "A Multimodal Fusion Framework for Brand Recognition from Product Image and Context," in 2020 IEEE International Conference on Multimedia & Expo Workshops (ICMEW), Jul. 2020, 4 pages.

* cited by examiner

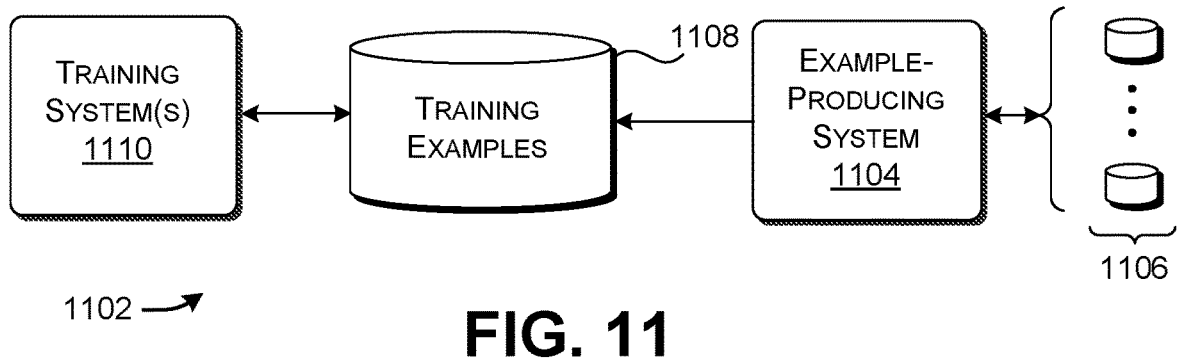

FIG. 11

OVERVIEW OF OPERATION OF THE ITEM NAME IDENTIFIER CLASSIFIER SYSTEM 1202

IN RESPONSE TO A TRIGGERING EVENT, RECEIVING AN INSTRUCTION TO OPERATE ON AN ELECTRONIC DOCUMENT, THE ELECTRONIC DOCUMENT INCLUDING AT LEAST AN INPUT IMAGE AND EXTERNAL TEXT, THE EXTERNAL TEXT APPEARING OUTSIDE OF THE INPUT IMAGE IN THE ELECTRONIC DOCUMENT.
1204

PARSE THE ELECTRONIC DOCUMENT TO IDENTIFY THE INPUT IMAGE AND THE EXTERNAL TEXT.
1206

IDENTIFY ONE OR MORE CANDIDATE REGIONS IN THE INPUT IMAGE, EACH CANDIDATE REGION ENCOMPASSING AN OBJECT.
1208

```
                    ┌─────────────────────────┐
                    │  CONTINUED FROM FIG. 12 │
                    └─────────────────────────┘
                                 │
                                 ▼
```

DETERMINE ONE OR MORE TARGET REGIONS FROM AMONG THE ONE OR MORE CANDIDATE REGIONS, EACH TARGET REGION ENCOMPASSING AN OBJECT-OF-INTEREST AND BEING ASSOCIATED WITH AN ITEM NAME. THIS OPERATION INCLUDES GENERATING ONE OR MORE INSTANCES OF REGION-FEATURE INFORMATION RESPECTIVELY ASSOCIATED WITH THE ONE OR MORE TARGET REGIONS.
1302

CONVERT INTRA-IMAGE TEXT THAT APPEARS IN THE INPUT IMAGE INTO INTRA-IMAGE TEXT INFORMATION.
1304

CONVERT THE EXTERNAL TEXT THAT APPEARS OUTSIDE THE INPUT IMAGE INTO ENCODED CONTEXT INFORMATION.
1306

DETERMINE A PARTICULAR ITEM NAME ASSOCIATED WITH A GIVEN TARGET REGION BASED ON GIVEN REGION-FEATURE INFORMATION ASSOCIATED WITH THE GIVEN TARGET REGION, THE INTRA-IMAGE TEXT INFORMATION, AND THE ENCODED CONTEXT INFORMATION.
1308

FIG. 13

FIRST FUSION TECHNIQUE 1402

FUSE THE INTRA-IMAGE TEXT INFORMATION WITH THE ENCODED CONTEXT INFORMATION TO PRODUCE TEXT FUSION INFORMATION.
1404

FUSE THE TEXT FUSION INFORMATION WITH THE GIVEN REGION-FEATURE INFORMATION ASSOCIATED WITH THE GIVEN TARGET REGION, TO PRODUCE COMBINED FUSION INFORMATION.
1406

DETERMINE THE PARTICULAR ITEM NAME BASED ON COMBINED FUSION INFORMATION.
1408

FIG. 14

SECOND FUSION TECHNIQUE 1502

DETERMINE A FIRST ASSESSMENT OF THE PARTICULAR ITEM NAME BASED ON THE GIVEN REGION-FEATURE INFORMATION.
1504

DETERMINE A SECOND ASSESSMENT OF THE PARTICULAR ITEM NAME BASED ON THE INTRA-IMAGE TEXT INFORMATION.
1506

DETERMINE A THIRD ASSESSMENT OF THE PARTICULAR ITEM NAME BASED ON THE ENCODED CONTEXT INFORMATION.
1508

DETERMINE A FINAL ASSESSMENT OF THE PARTICULAR ITEM NAME BASED ON THE FIRST, SECOND, AND THIRD ASSESSMENTS.
1510

FIG. 15

PROCESSING IMAGE-BEARING ELECTRONIC DOCUMENTS USING A MULTIMODAL FUSION FRAMEWORK

BACKGROUND

Some computer-implemented tools attempt to automatically detect the particular kind of object that is depicted in or is otherwise associated with an input image. For example, computer-implemented tools exist for detecting the entity that makes or otherwise supplies a product depicted in an image. Traditionally, a developer may approach this task by producing a handcrafted set of object-detecting features. But this solution is labor intensive. Further, it may be difficult for a developer to generate a set of features that accounts for the myriad of ways in which object-related information may appear in images. The factors that govern the appearance of object-related information may include: the size of the object-related information, the orientation the object-related information, the resolution of the object-related information, the level of brightness of the object-related information, the presence of one or more objects in the image that obscure the object-related information, and so on. These challenges may cause the tools to produce unsatisfactory detection results. Other tools use machine-learned models to detect the presence of object-related information in images. These tools may perform better than image analysis that use handcrafted features. However, these tools may also produce inaccurate results due to the above factors.

SUMMARY

A computer-implemented technique is described herein that identifies at least one item name associated with an input image using a multi-modal fusion approach. An item name refers to a name of an item that is depicted by or is otherwise associated with an input image. The technique is said to be multi-modal because it collects and processes different kinds of evidence regarding an item name. The technique is said to adopt a fusion approach because it fuses the multi-modal evidence into an output conclusion that identifies at least one item name associated with the input image.

According to one illustrative aspect, a first mode collects evidence by identifying and analyzing target regions in the input image that are likely to include item-name-related information. A second mode collects and analyzes any text that appears as part of input image itself. A third mode collects and analyzes text that is not included in the input image itself, but is nonetheless associated with the input image. This text is referred to herein as external text. For example, the external text may correspond to a caption or title within an electronic document in which the input image appears or is otherwise associated.

According to another illustrative aspect, the technique can perform the above-described functions using one or more neural networks in conjunction with an optical character recognition (OCR) component. For example, the technique can identify and analyze regions in the input image using one or more neural networks. The technique can encode external text using one or more other neural networks. Further, the technique can use one or more neural networks to fuse the evidence collected by its plural modes.

According to another illustrative aspect, the technique can invoke its analysis of the electronic document when a user accesses the electronic document, or there is otherwise a decision to send the electronic document to the user. After identifying an item name associated with the input image, the technique can determine a supplemental content item associated with the item name. The technique then sends the supplemental content item to a user computing device operated by the user.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 11 shows a training framework for training one or more models used by the item name identifier system of FIG. 1.

FIGS. 12 and 13 together show a process that describes one illustrative manner of operation of the item name identifier system of FIG. 1.

FIG. 14 shows a process that describes one way of fusing multi-modal evidence in the item name identifier system of FIG. 1.

FIG. 15 shows another process that described one way of fusing multi-modal evidence in the item name identifier system of FIG. 1.

Figure 1:
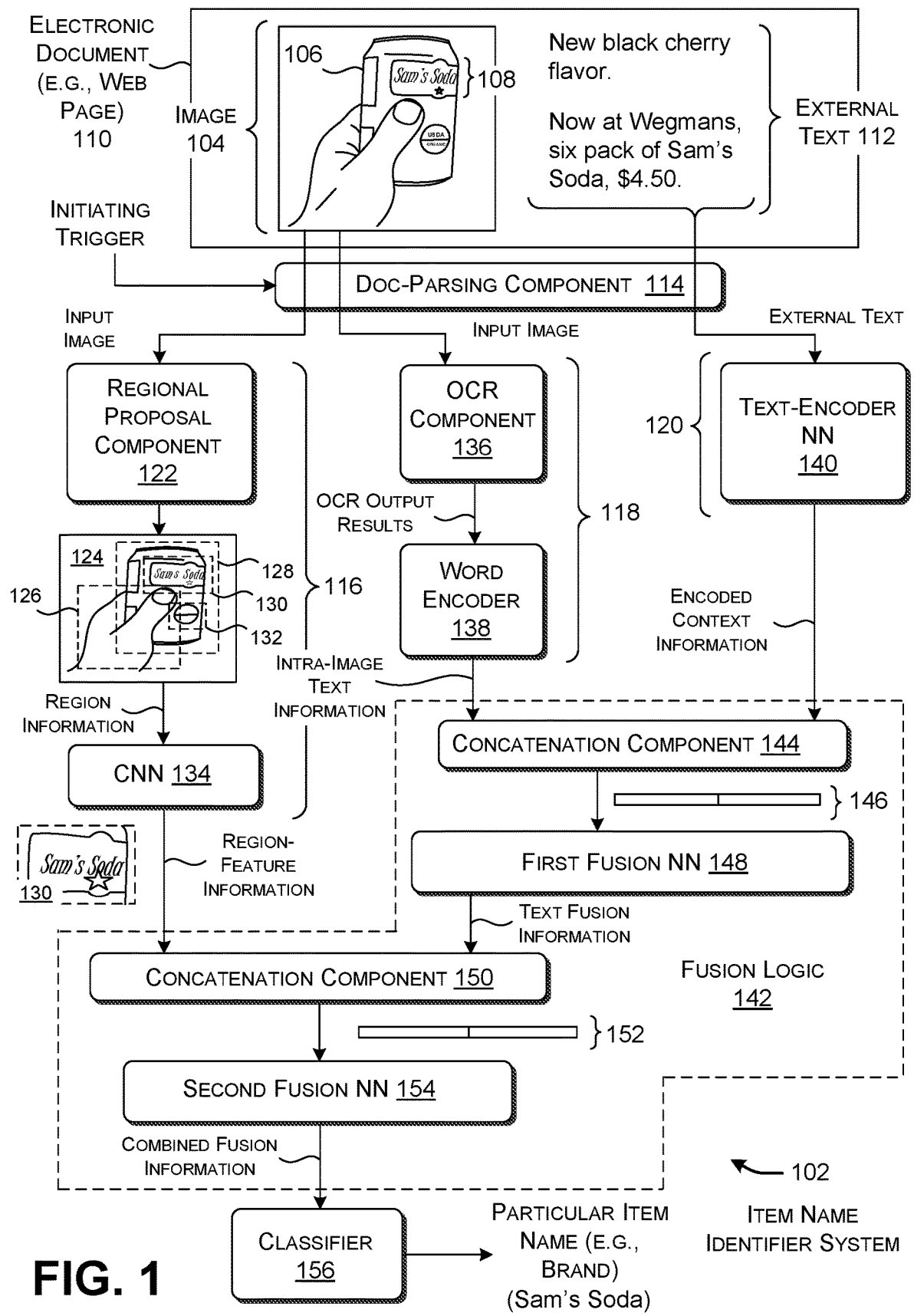
FIG. 1 shows an illustrative item name identifier system for classifying at least one item name associated with an input image.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented item name identifier system. Section B sets forth illustrative methods which explain the operation of the item name identifier system of Section A. And Section C describes illustrative computing functionality that can be used to implement any aspect of the features described in Sections A and B.

As a preliminary matter, the term "hardware logic circuitry" corresponds to technology that includes one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component," "engine," "system," and "tool" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further still, the descriptors "first," "second," "third," etc. are used to distinguish among different items, and do not imply an ordering among items, unless otherwise noted. Finally, the terms "exemplary" or "illustrative" refer to one implementation among potentially many implementations.

A. Illustrative Computing Systems

A.1. Overview

FIG. 1 show one implementation of an item name identifier system 102. The item name identifier system 102 is configured to identify one or more item names associated with an input image 104. For example, the input image 104 shown in FIG. 1 shows a person holding a can 106 produced by a company named "Sam's Soda." The item name identifier system 102 will therefore identify the item name associated with the input image as "Sam's Soda."

The term "item name" generally refers to a name assigned to a product or service or other kind of item, or the name associated with a property of the product or service or other kind of item. In some cases, the item name also directly and/or indirectly conveys at least an entity that is associated with the item. For example, in some cases, the item name directly and/or indirectly identifies the particular entity that makes or otherwise provides the item. In some cases, the item name is synonymous with the brand of the item. Here, people use the item name to identify an item as being affiliated with a particular provider, and to distinguish the item from similar items produced by other providers. In many cases, some legal authority formally recognizes the item name associated with an item. In other cases, the item name of an item has no legally-conferred protection. For example, a craftsman may create a fashion accessory that has a telltale visual characteristic by which consumers come to recognize the accessory as originating from that particular craftsman, and not another; but that craftsman may not have registered the telltale visual characteristic of his or her accessory with any governmental agency. The item name in this example may identify the name of the craftsman or his or her company.

In some cases, an item name is also associated with one or more logos, any of which may also appear in the input image 104. For some of these cases, a logo may include text that directly conveys the item name. In other cases, the logo may not include text, or may include text that that does not directly identify the item name. In the example of FIG. 1, the input image 104 includes a logo 108 associated with the item name, which appears on the can 106. More generally, an input image can convey information associated with an item name with or without also including a logo associated with that item name. Viewed from another perspective, the subject matter that constitutes item name information is governed by the kinds of objects and image features identified as item name-related in a set of training images; a training system uses these training images to train various models used by the item name identifier system 102.

In the example of FIG. 1, the input image 104 appears as part of an electronic document 110. The electronic document 110 may correspond to a web page hosted by the maker of the beverage Sam's Soda. Alternatively, the electronic document 110 may correspond to a digital advertisement to be presented to a user. Alternatively, the electronic document 110 may correspond to a document submitted by the user to a search engine or other processing system. Subsection A.2 (below) provides additional information regarding applications that may incorporate or otherwise use the item name identifier system 102. That section will clarify the contexts in which the item name identifier system 102 operates on the electronic document 110. In still another context, an electronic document may include a bundle of information items that are not necessarily displayed at the same time.

The particular electronic document 110 shown in FIG. 1 includes intra-image text and external text 112. The intra-image text includes alphanumeric information that is part of the image itself. For instance, the intra-image text includes the name "Sam's Soda," "USDA," "organic," ingredient and nutrition information, etc. The external text 112 provides information regarding the product shown in the input image 104. The external text 112 can generally appear as a title or caption associated with the input image 104, descriptive text in proximity to the input image 104, and so on, or any combination thereof. Although not shown, the external text 112 can also include metadata associated with the input image 104. The metadata, if available, is not necessarily visually presented on the electronic document 110 itself. For example, the metadata associated with the input image 104 may provide one or more key terms associated with a product depicted in the input image 104.

The components of the item name identifier system 102 shown in FIG. 1 will generally be set forth below in top-to-bottom fashion. To begin with, a document-parsing component 114 provides logic for extracting information from the electronic document 110. The document-parsing component 114 operates by extracting the input image 104 from the electronic document 110 and routing the input image 104 to the image-processing logic of the item name identifier system 102, described below. The document-processing component 114 also extracts the external text 112 based on one or more predetermined rules, and forwards the external text 112 to the context-processing logic of the item name identifier system 102, described below.

According to one rule, the document-parsing component 114 extracts all text from the electronic document 110 in which the input image 104 appears. According to another rule, the document-parsing component 114 extracts the title and/or caption of the input image 104. According to another rule, the document-parsing component 114 extracts all text within a predetermined distance from the input image 104 on the electronic document 110. According to another rule, the document-parsing component 114 can select only those portions of text which have an identified semantic relation to the subject matter of the input image. The document-parsing component 114 can perform this task in different ways. For example, the document-parsing component 114 can extract a portion of text in the electronic document 110 if it includes one or more key terms that also appear in the title of the input image 104. Alternatively, or in addition, the document-parsing component 114 can use a deep neural network (DNN) to map the input image 104 to a first vector in a low-dimensional semantic space, map a portion of text to a second vector in the semantic space, and then select the text if the two vectors are within a predetermined distance in the semantic space, e.g., as measured by cosine similarity or some other distance metric. According to another rule, the document-parsing component 114 can limit the external text 112 that it extracts from the electronic document 110 to a predetermined number of words, such as 512 words in one merely illustrative case. According to another rule, the document-parsing component 114 can select plural pieces of external text associated with plural respective categories (e.g., information extracted from the title of the input image 104 and information extracted from a body of text that appears in the electronic document 110) and apply different weights to these respective pieces of text. The above-described selection rules are set forth in the spirit of illustration, not limitation; other implementations can adopt other rules.

The item name identifier system 102 includes three branches of processing functionality associated with three respective modes. For this reason, the item name identifier system 102 can also be referred to as a multimodal fusion framework. A region analysis branch 116 identifies and analyzes regions in the input image 104 that are likely to contain logo information, or other image information pertinent to an object-of-interest. An intra-image text analysis branch 118 extracts and analyzes any text that appears in the input image 104; as stated, that text is referred to herein as intra-image text. An external-text analysis branch 120 analyzes the external text 112. These three branches (116, 118, 120) are described below in the context of detecting brand names, but, as will be clarified below, the item name identifier system 102 can be applied to determine other kinds of item names.

Beginning with the region analysis branch 116, a region proposal component 122 identifies zero, one, or more candidate regions that may include any types of objects, including, but not limited to, include logo information. In the example of FIG. 1, the region proposal component 122 produces an annotated image 124 that identifies a region 126 associated with a hand, a region 128 associated with a can, a region 130 associated with a logo, a region 132 associated with a nutrition-related label, and so on. This is a simplified set of candidate regions presented for the purpose of explanation; in actuality, the region proposal component 122 can produce a large number of candidate regions.

A convolutional neural network (CNN) maps the annotated image 124 to an output result that identifies one or more target regions. Each target region encompasses an object-of-interest and is associated with a product name. In some cases, the item name also conveys an entity with which the target region is affiliated. For instance, each target region encompasses logo information (which is the object-of-interest in this example) that identifies the entity which makes and/or supplies an item. The target region may show the logo information by itself, or it may show the logo information affixed to a product. In the specific example of FIG. 1, the CNN 134 indicates that the candidate region 130 corresponds to a target region. The CNN 134 outputs information that specifies each target region. The CNN 134 also provides feature information associated with each target region, which is referred to herein as region-feature information. The region-feature information associated with a target region may correspond to the feature values generated by a last layer of the CNN 134. Additional information regarding the region analysis branch 116 is provided below in Subsection A.3.

In an alternative case, the region analysis branch 116 may determine that the input image 104 includes no target regions that are pertinent to the object-of-interest (in this example, logo information). In that case, the region analysis branch 116 can produce default information that conveys the fact that the input image 104 contains no relevant target regions.

As to the intra-image text analysis branch 118, an optical character recognition (OCR) component 136 performs optical character recognition on the input image 104 to produce OCR output results. The OCR output results identify all of the text contained in the input image 104 (here, "Sam's Soda," "USDA," "organic," etc.). The OCR component 136 can use any technique to perform this task, such as a DNN, a hidden Markov model (HMM), etc. A word encoder 138 then maps the OCR output results into intra-image text information. The word encoder 138 can be implemented in different ways, such as by an encoder that computes a term frequency-inverse document frequency (tf-idf) score for each word in the OCR output results, and then formulates an output vector that conveys those scores. A tf-idf score identifies the number of times (tf) that a term appears in a document. It also determines the number of documents d among a corpus of N documents that include the term. The tf-idf score equals tf·log(N/d). In another case, the word encoder 138 use any type of neural network to map the OCR output results to an output vector, such as the well-known Word2vec model. Still other implementations are possible. Note that the intra-image text analysis 118 branch operates on the input image 104 as a whole, and likewise produces intra-image text information that is associated with the input image 104 as a whole. In contrast, the region analysis branch 116 identifies individual regions in the input image 104, and generates region-feature information associated with each individual target region.

In an alternative case, the OCR component 136 may determine that the input image 104 includes no internal text. In that case, the word encoder 138 produces default intra-image text information that conveys the fact that the input image 104 contains no text.

The external-text analysis branch 120 includes a text-encoder neural network ("text encoder" for brevity) 140 that maps the external text 112 into encoded context information. Different implementations can implement the text encoder in different implementations. Without limitation, the text encoder 140 may correspond to a transformer neural network. Additional information regarding this non-limiting implementation of the text encoder 140 will be set forth below in Subsection A.3. In other implementations, the text encoder 140 can be implemented as any other type of neural network, such as a CNN, a recurrent neural network (RNN), etc., or any combination thereof. If the electronic document 110 contains no external text 112, then the external-text analysis branch 120 can provide default context information that conveys that fact.

Fusion logic 142 combines an instance of region-feature information, the intra-image information, and the encoded context information together to produce combined fusion information. The fusion logic 142 can be implemented in different ways. In one approach, a first concatenation component 144 concatenates a vector that provides the intra-image text information with a vector that provides the encoded context information, to produce a first concatenated vector 146. The fusion logic 142 then uses a first fusion neural network 148 to map the first concatenated vector 146 into text fusion information. A second concatenation component 150 concatenates a vector that provides the text fusion information with a vector that provides the region-feature information associated with the target region 130, to produce a second concatenated vector 152. A second fusion neural network 154 maps the second concatenated vector 152 into the combined fusion information. In one implementation, the first fusion neural network 148 and the second fusion neural network 154 may correspond to respective fully-connected (FC) neural networks, each having two or more layers, and each of which can use any activation function (e.g., ReLU). In this fusion operation, any one or more of the region-feature information, intra-image text information, and encoded context information can correspond to default information. For example, the encoded context information corresponds to default information in the case in which the external document 110 does not have any external text.

A classifier 156 classifies the particular item name associated with the target region 130 based on the combined fusion information. The classifier 156 can be implemented in different ways, such as the softmax function, a support vector machine (SVM), a logistic regression model, etc. In the example of FIG. 1, the classifier 156 provides an output result that indicates that the target region 130 is associated with the particular item name "Sam's Soda." In one implementation, the classifier 156 can determine the item name by determining the probability of each of a plurality of predetermined item names, and by choosing the item name with the highest probability, providing that the probability of this name is above a prescribed threshold value.

The item name identifier system 102 can repeat the above-described fusion and classification operations for each target region identified by the branch analysis branch 116. For example, assume that the input image includes objects associated with two or more item names, which, in turn, are associated with two or more target regions. The item name identifier system 102 can determine all of the item names by processing each target region in turn. In another implementation, the item name identifier system 102 can process plural target regions in parallel.

Other implementations can fuse the above-described three modes together in different ways compared to that described above. For example, another implementation can fuse the region-feature information with the text fusion information, and then fuse the result of that combination with the encoded context information. Another implementation can use a single pipeline to operate on the logo information, intra-image text, and external text 112.

In one implementation, the item name identifier system 102 can selectively weight the information that it produces using its plural modes. For example, the item name identifier system 102 can apply a weight to the information produced by each branch based on a level of confidence associated with the information. The weight applied to a piece of information establishes its relevance vis-à-vis other pieces of information in the subsequent fusion and classification operations. That is, a piece of information with a high confidence level will be treated as more relevant than a piece of information with a lower confidence level.

Consider the example in which the input image 102 contains a relatively small logo associated with a product, or a logo that is otherwise difficult to discern (e.g., because of its orientation to the viewer, and/or because it is partially occluded by another object, and/or because it has low resolution, etc.). The CNN 134 can produce a confidence measure that reflects a level of confidence that it has detected a logo. In this case, the confidence measure will be relatively low. As a result, the item name identifier system 102 can reduce the relevance of the information produced by the region analysis branch 116, relative to the weight applied by the two other branches (118, 120). This also means that the item name identifier system 102 will rely on the intra-image text (if any) and/or external text 112 (if any) to a greater extent in this example compared to another case in which the logo is clearly discernable in the input image 104.

Figure 2:
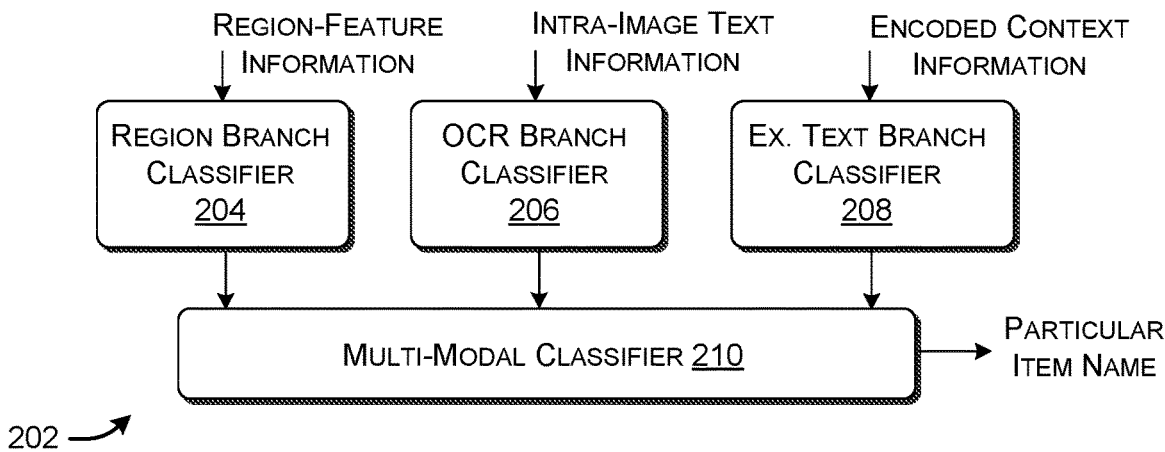
FIG. 2 shows an alternative framework for synthesizing feature information compared to that shown in FIG. 1.

FIG. 2 shows yet another architecture 202 for fusing the type of information collected in FIG. 1. A region branch classifier 204 generates a first assessment of the item name depicted in a target region based on the region-feature information provided by the region analysis branch 116. An OCR branch classifier 206 generates a second assessment of the item name based on the intra-image text information provided by the intra-image text analysis branch 118. An external-text classifier 208 generates a third assessment of the item name conveyed by the encoded context information provided by the external-text analysis branch 120. A multi-modal classifier 210 generates a final determination of the item name associated with a target region based on the three assessments provided by the above-identified three classifiers (204, 206, 208). Each of the above-identified classifiers can be implemented in any manner, such as a softmax function, a support vector machine (SVM), a deep neural network (DNN), a logistic regression classifier, etc. In this example, the multi-modal classifier 210 can said to embody both fusion logic and classification logic.

Figure 3:
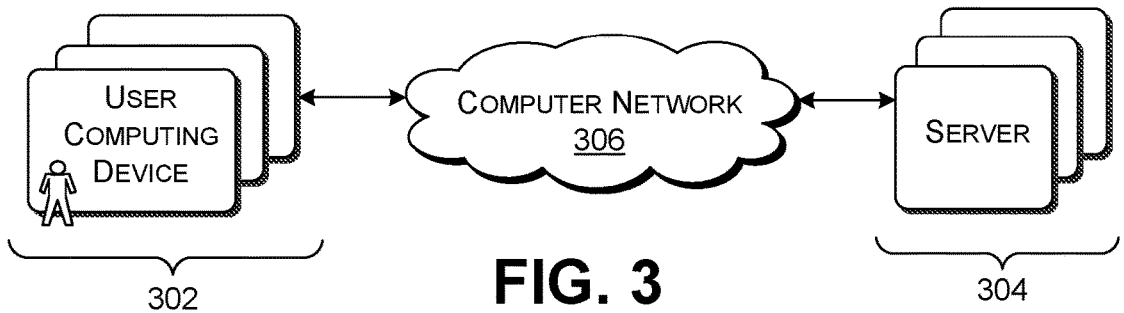
FIG. 3 shows computing equipment that can be used to implement the item name identifier system of FIG. 1.

FIG. 3 shows computing equipment that can be used to implement the functionality of FIGS. 1 and 2. The equipment includes plural user computing devices 302 that interact with one or more servers 304 via a computer network 306. The user computing devices 302 can include any of: desktop computing devices, laptop computing devices, handheld computing devices of any type (smartphones, tablet-type computing devices), etc., game consoles, cable boxes, mixed-reality devices, wearable devices, etc. The computer network 306 may correspond to a wide area network (e.g., the Internet), a local area network, etc.

The elements of the item name identifier system 102 can be distributed between the user computing devices 302 and the servers 304 in any manner. For example, in one implementation, each user computing device implements a local instantiation of the item name identifier system 102. In another implementation, one or more servers implement the entirety of the item name identifier system 102. In another implementation, the functional features of the item name identifier system 102 are distributed between the local computing devices 302 and the servers 304.

In the above examples, the item name identifier system 102 identifies brand names associated with objects within the input image 104. But the item name identifier system 102 can use the above-described tri-modal approach to detect the names of other kinds of objects-of-interest in an image. For instance, consider the case in which the input image shows two breeds of dogs, possibly along with other objects. And further assume that the item name identifier system 102 is specifically configured to identify the names of dogs in electronic documents. In this case, the region analysis branch 114 can detect two target regions that respectively encompass the two dogs, the dogs being objects-of-interest. The intra-image text analysis branch 118 can detect any text within the input image 108, some of which may pertain to dogs. For example, the input image may show the name of a pet store in the background, or a caption that is part of the image itself. The external-text analysis branch 120 could extract external text from the electronic document, some of which may pertain to the kinds of dogs shown in the image. The item name identifier system 102 can synthesize all of this information in the above-described manner to generate an output result that provides the names of the two dogs, e.g., "Shiatzu" and "Labrador Retriever."

In still other examples, an item name may identify the name of a feature of a product, rather than characterizing the product in its entirety. For example, the item name identifier system 102 can be used to identify a fashion style present in an image. For instance, the item name identifier system 102 can apply the above approach to output the item name "hounds tooth" when an article of clothing appears in an input image that exhibits this pattern. Again, the item name identifier system 102 can cull evidence from the above-described three channels of analysis in drawing this conclusion. This example more generally demonstrates that the term "item name" as used herein can be considered synonymous with "property name." Brand name is just one property of an input image.

Further, the above examples described the use of three branches of analysis. But other implementations can generally include plural branches of analysis, e.g., by generally using two or more branches of analysis, not limited to three branches.

In conclusion to this subsection, the item name identifier system 102 can produce superior classification results compared to classification systems that depend on a single mode of analysis. For example, consider an example in which a classification system detects an object-of-interest in an input image using image-based analysis by itself. This classification system may produce unsatisfactory results in those cases in which the object-of-interest is difficult to discern in the input image. In contrast, the item name identifier system 102 uses plural modes to collect information regarding the object-of-interest, and uses fusion and classification logic in which these different pieces of information mutually bolster each other. This allows the item name identifier system 102 to produce satisfactory classification results even when the object-of-interest is difficult to discern in an input image.

A.2. Illustrative Applications

Figure 4:
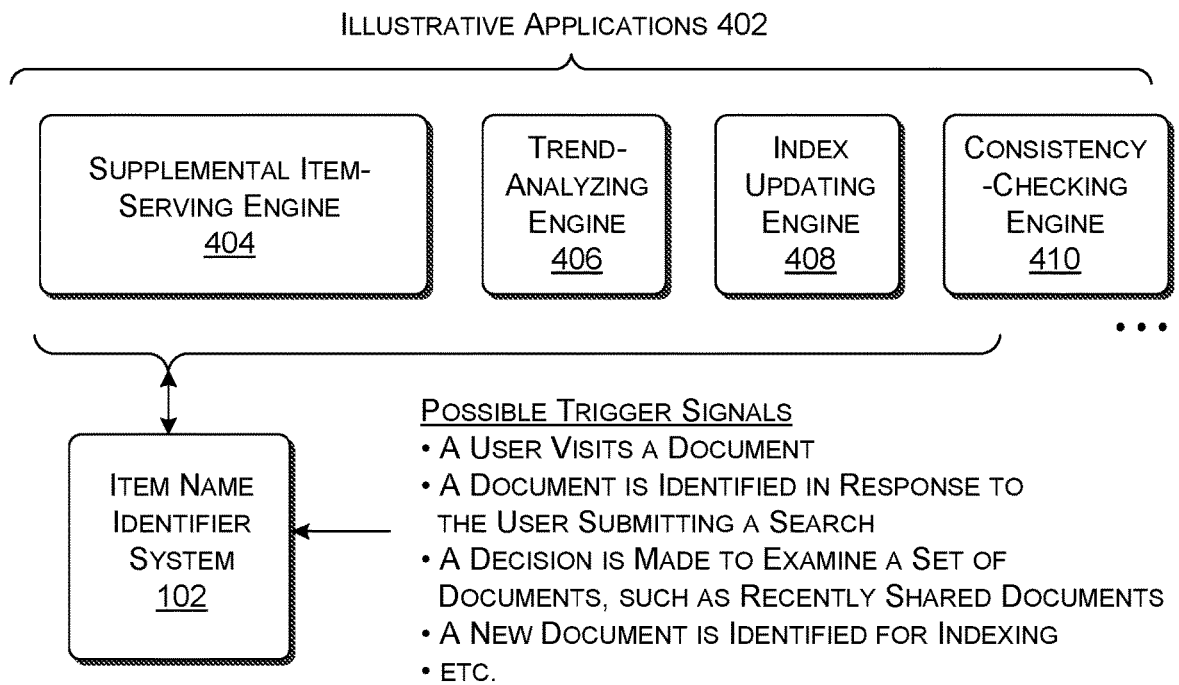
FIG. 4 shows different applications that can make use of the item name identifier system of FIG. 1.

FIG. 4 shows a non-exhaustive set of applications 402 that can make use of the item name identifier system 102. The applications 402 include an item-serving engine 404, a trend-analyzing engine 406, an index-updating engine 408, a consistency-checking engine 410, and so on. The applications 402, like the item name identifier system 102 itself, can be distributed between the user computing devices 302 and the servers 304 in any manner.

Figure 5:
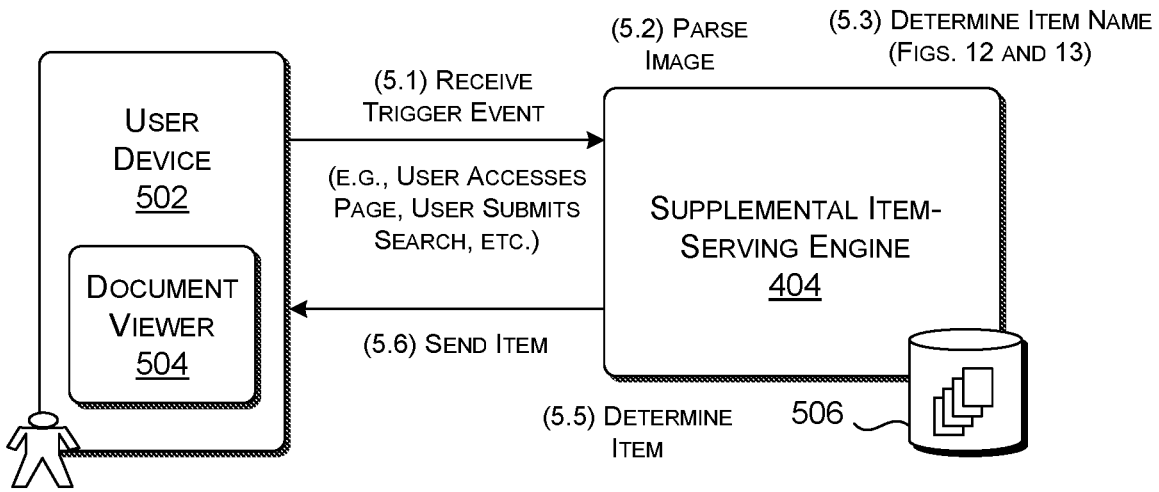
FIG. 5 shows one illustrative application of the item name identifier system of FIG. 1.

FIG. 5 shows further details regarding the item-serving engine 404 of FIG. 4. A user interacts with the item-serving engine 404 using a user computing device 502. The user computing device 502, in turn, includes a document viewer 504 that enables a user to interact with electronic documents. For example, the document viewer 504 may correspond to a browser that is locally implemented by the user computing device 502. The browser enables the user to view web pages hosted by one or more web sites.

The operation of the application shown in FIG. 5 will be described below in conjunction with the illustrative electronic document 602 shown in FIG. 6. In one implementation, the user enters an instruction to load the electronic document 602. For example, the user may click a link in the document viewer 504 that is associated with the electronic document 602. The document viewer 504 responds by displaying the electronic document 602 on a display device provided by the user computing device 502. In operation 5.1, based on the above triggering event, the item-serving engine 404 receives an instruction to operate on the electronic document 602. For example, in response to the triggering event, the item-serving engine 404 can receive a uniform resource locator (URL) associated with the electronic document 602 to be processed, together with an instruction to operate on this electronic document 602.

Figure 6:
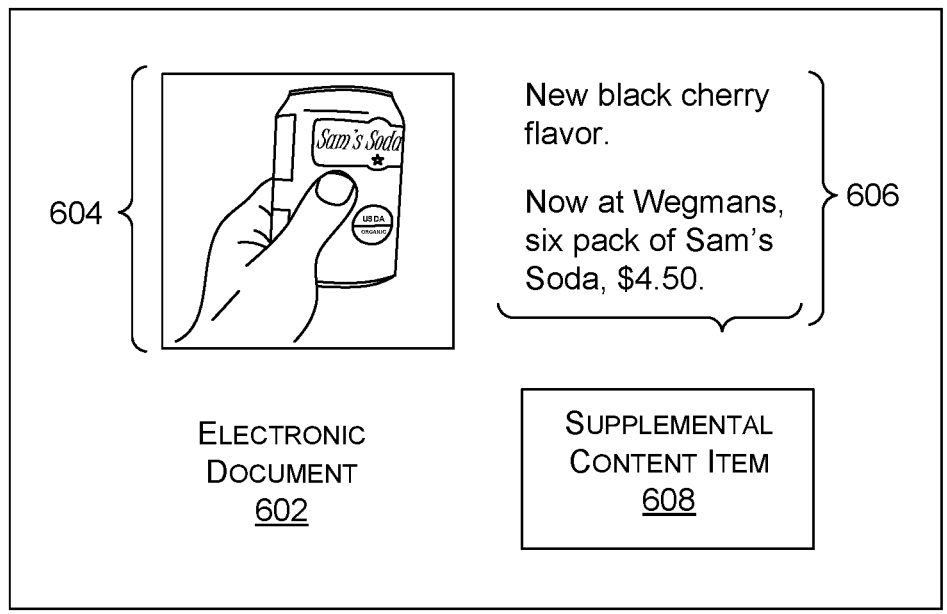
FIG. 6 shows how the application of FIG. 5 may represent a supplemental content item within an electronic document.

In the merely illustrative case of FIG. 6, the electronic document 602 is a web page associated with a beverage. The input image 604 depicts the beverage. As previously discussed, the input image 604 includes text that is part of the input image 604 itself. The electronic document 602 also includes external text 606 that is outside of the input image 604, and is not part of the input image 604.

In another case, the triggering event occurs when a user performs an action that only indirectly implicates the electronic document 602. For example, the user may enter a search query into a search engine. The search engine may determine that a top-ranking document 602 matches the user's search query, and that this top-ranking document 602 includes the input image 604. In this example, the triggering event may correspond to the submission of a search query, which precedes presentation of the electronic document 602 on a display device. Still other triggering events may invoke the services of the item-serving engine 404; the above examples are set forth in the spirit of illustration, not limitation.

In operation 5.2, the item-serving engine 404 uses the item name identifier system 102 to parse the electronic document 602. In operation 5.3, the item-serving engine 404 uses the item name identifier system 102 to determine at least one item name associated with at least one target region. In operation 5.4, the item-serving engine 404 uses a particular item name to identify one or more matching supplemental content items. The item-serving engine 404 can perform this retrieval option based on the item name information alone, or in combination with one or more other features that the item-serving engine 404 extracts from the electronic document 602. For example, the item-serving engine 404 can perform additional analysis on the input image 604 using one or more neural networks to determine the type of object depicted therein, the color of the object, the pattern exhibited by the object, and so on. The neural network(s) can represent each of these additional properties as a key word or a key phrase. The item-serving engine 404 can use the particular item name in combination with the additional key terms to identify one or more matching supplemental content items.

More specifically, in one non-limiting case, a data store 506 stores a collection of candidate supplemental content items, e.g., corresponding to digital advertisements, etc. Assume that each supplemental content item is associated with one or more key terms. The item-serving engine 404 can perform a retrieval option by identifying one or supplemental content items having key terms that most closely match the key terms extracted from the electronic document 602. In operation 5.6, the item-serving engine 404 sends the supplemental content item(s) or links to these items(s) to the user computing device 502. This causes the document viewer 504 to display the supplemental content item(s) to the user. In the example of FIG. 6, the document viewer 504 displays a supplemental content item 608 in the same electronic document 602 in which the input image 604 appears, although this need not be the case in all implementations.

Returning to FIG. 4, a trend-analyzing engine 406 can use the item name identifier 102 to identify an item name associated with each of a set of documents. After identifying the item names associated with the set of documents, the trend-analyzing engine 406 can generate any statistical conclusions regarding the documents. For example, the trend-analyzing engine 406 can determine the item name that appears most frequently in the set of documents. Or the trend-analyzing engine 406 can determine the item names that most commonly appear together in the set of documents, and so on.

The trend-analyzing engine 406 can use any factor(s) to define the members of a set of documents. For example, the trend-analyzing engine 406 can determine images associated with documents that a particular user has recently visited. Or the trend-analyzing engine 406 can determine images associated with documents that a group of users have resent visited. Or the trend-analyzing engine 406 can determine images associated with documents that a group of users have recently shared with each other, and so on.

An index-updating engine 408 leverages the item name identifier system 102 in the process of updating an index used by a search engine. The search engine uses the index to locate relevant documents, given a search query submitted by a user. More specifically, the index-updating engine 408 can determine the item name associated with each individual electronic document or each individual image that it processes. The index-updating engine 408 can then add item name information to an index entry associated with this electronic document or individual image.

A consistency-checking engine 410 can determine whether a particular item name is consistent with other information submitted by an entity. For example, an advertiser may submit a bundle of information that includes textual information regarding a product, together with an image associated with the product. The consistency-checking engine 410 can use the item name identifier system 102 to determine the item name associated with the input image. The consistency-checking engine 410 can then determine whether the identified item name is consistent with the textual information. For example, the consistency-checking engine 410 can flag an inconsistency when the image includes a logo for the item name NIKE, yet the textual information identifies the product as pertaining to the item name ADDIDAS.

Once again, the above example applications 402 are set forth in the spirit of illustration not limitation. Other applications can make use of the item name identifier system 102. In each case, the application invokes the services of the item name identifier system 102 in response to a triggering event.

A.3. Individual Components of the Item Name Identifier System

Figure 7:
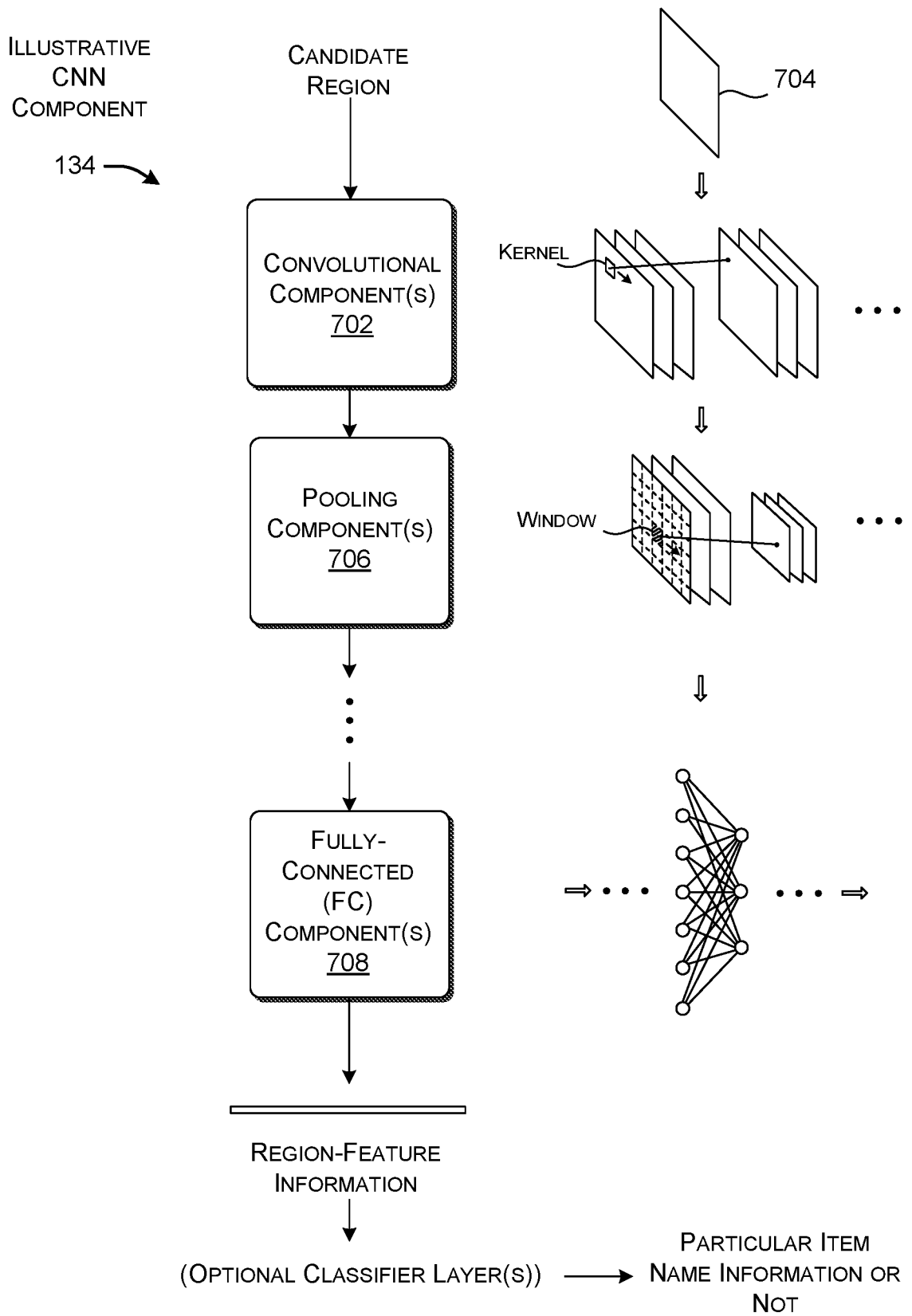
FIG. 7 shows a convolutional neural network (CNN) that can be used to implement one or more elements of the item name identifier system of FIG. 1.

This subsection sets forth illustrative details regarding individual components used by the item name identifier system 102 of FIG. 1. To being with, FIG. 7 shows the convolutional neural network (CNN) 134 used in the region analysis branch 116. The CNN 134 show in FIG. 7 performs analysis in a pipeline of stages. One of more convolutional components 702 perform a convolutional operation on an input image 704. In the context of the example of FIG. 1, the input image 704 may correspond a candidate region identified by the region proposal component 122. One or more pooling components 706 perform a down-sampling operation. One or more fully-connected components 708 respectively provide one or more fully-connected neural networks, each including any number of layers. More specifically, the CNN 134 can intersperse the above three kinds of components in any order. For example, the CNN 134 can include two or more convolutional components interleaved with pooling components.

In each convolutional operation, a convolutional component moves an n×m kernel across an input image (where "input image" in this general context refers to whatever image is fed to the convolutional component). In some implementations, at each position of the kernel, the convolutional component generates the dot product of the kernel values with the underlying pixel values of the image. The convolutional component stores that dot product as an output value in an output image at a position corresponding to the current location of the kernel. More specifically, the convolutional component can perform the above-described operation for a set of different kernels having different machine-learned kernel values. Each kernel corresponds to a different pattern. In early layers of processing, a convolutional component may apply a kernel that serves to identify relatively primitive patterns (such as edges, corners, etc.) in the image. In later layers, a convolutional component may apply a kernel that finds more complex shapes (such as shapes associated with particular kinds of objects in each candidate region under analysis).

In each pooling operation, a pooling component moves a window of predetermined size across an input image (where the input image corresponds to whatever image is fed to the pooling component). The pooling component then performs some aggregating/summarizing operation with respect to the values of the input image enclosed by the window, such as by identifying and storing the maximum value in the window, generating and storing the average of the values in the window, etc. A pooling operation may also be referred to as a down-sampling operation. Although not shown, a counterpart up-sampling component can expand an input image into a larger-sized output image, e.g., by duplicating values in the input image within the output image.

A fully-connected component is often preceded by a flattening component (not shown in FIG. 7). A flattening component compresses an input image (or images) into a single input vector. It can perform this task by concatenating the rows or columns of the input image (or images) to form a single input vector. The fully-connected component then processes the input vector using a fully-connected neural network. To compute the output value of any particular neuron in a particular layer of a fully-connected network, the neuron generates the weighted sum of the values of the preceding layer, adds a bias value to the sum, and then applies an activation function to this result (such as the ReLU activation function or hyperbolic tangent function).

The last fully-connected layer of the CNN 134 provides a final representation of features associated with the input image 704. According to the terminology used herein, the features collectively correspond to region-feature information. A classification component may operate on the feature information to generate output conclusions. For example, the CNN 134 may include a softmax output operation, a support vector machine (SVM) classifier, etc. The classification component of the CNN 134 specifically determines whether a candidate region includes item name-related information, such as a logo.

Figure 8:
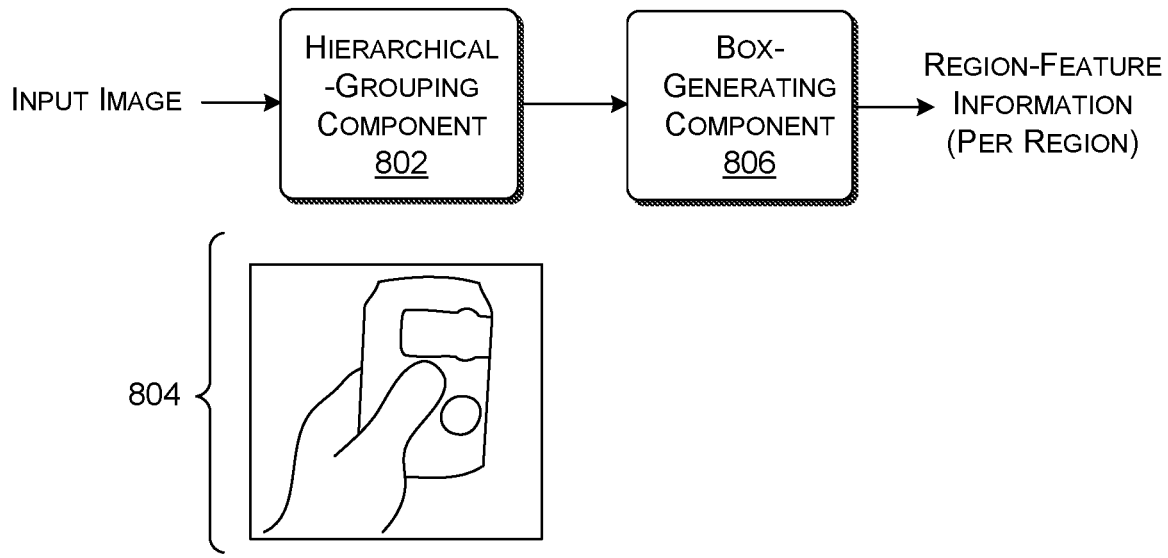
FIGS. 8 and 9 show two different region proposal components for use in the item name identifier system of FIG. 1.

FIG. 8 shows a first implementation of the region proposal component 122. The region proposal component 122 generally identifies candidate regions in an input image that potentially contain objects, not limited to logos. In the implementation of FIG. 8, a hierarchical-grouping component 802 uses a hierarchical-grouping algorithm to identify the candidate regions. In this approach, the hierarchical-grouping component 802 iteratively merges image regions in the input image that meet a prescribed similarity test, initially starting with relatively small image regions. The hierarchical-grouping component 802 can assess similarity based on any combination of features associated with the input image (such as color, brightness, hue, texture, etc.). The image 804 shows the illustrative output of the hierarchical-grouping component 802. Upon the termination of this iterative process, a box-generating component 806 draws bounding boxes around the identified regions. Background information regarding one non-limiting hierarchical-grouping technique is set forth in Uijlings, et al., "Selective Search for Object Recognition," in International Journal of Computer Vision, 104(2), 2013, pp. 154-171.

Figure 9:
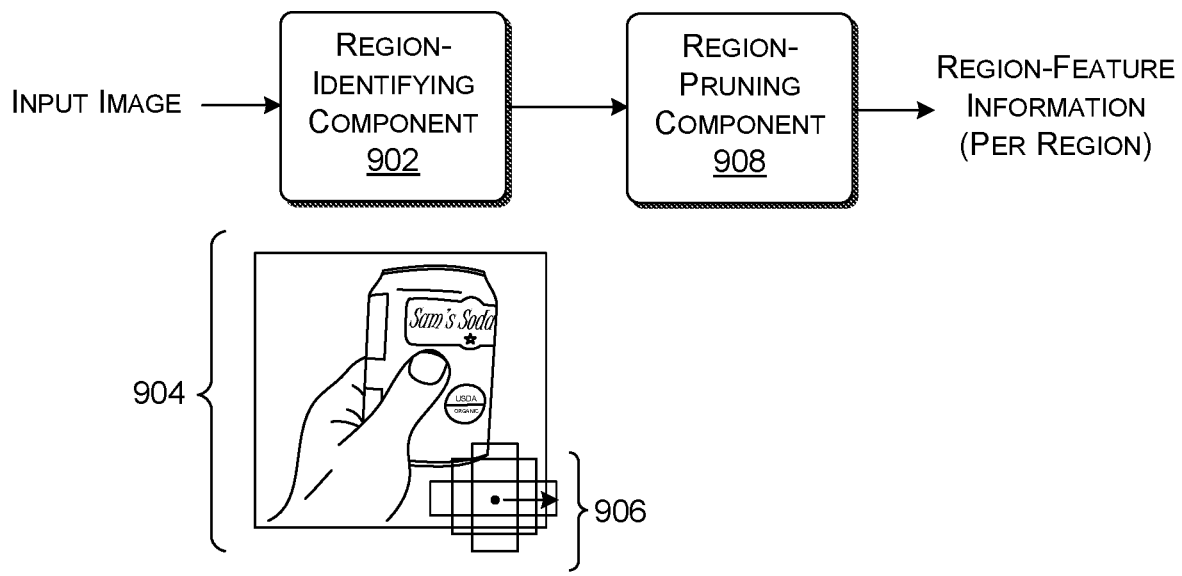

FIG. 9 shows a second implementation of the region proposal component 122. A region-identifying component 902 can define a grid of analysis points across an input image 904. At each analysis point, the region-identifying component 902 identifies plural candidate boxes. The candidate boxes can have different sizes and different aspect ratios. For instance, FIG. 9 shows an illustrative set 906 of candidate boxes at one particular analysis position in the input image 904. For each such candidate box, the region-identifying component 902 can use a neural network to determine whether the candidate box likely contains an object. A region-pruning component 908 identifies a representative region for each case in which plural candidate boxes overlap at least part of the same object of interest. The region-pruning component 908 can perform this task using the well-known non-maximum suppression (NMS) algorithm.

The above-described region proposal techniques are set forth in the spirit of illustration, not limitation. Still other approaches can be used to identify candidate regions in an input image.

Figure 10:
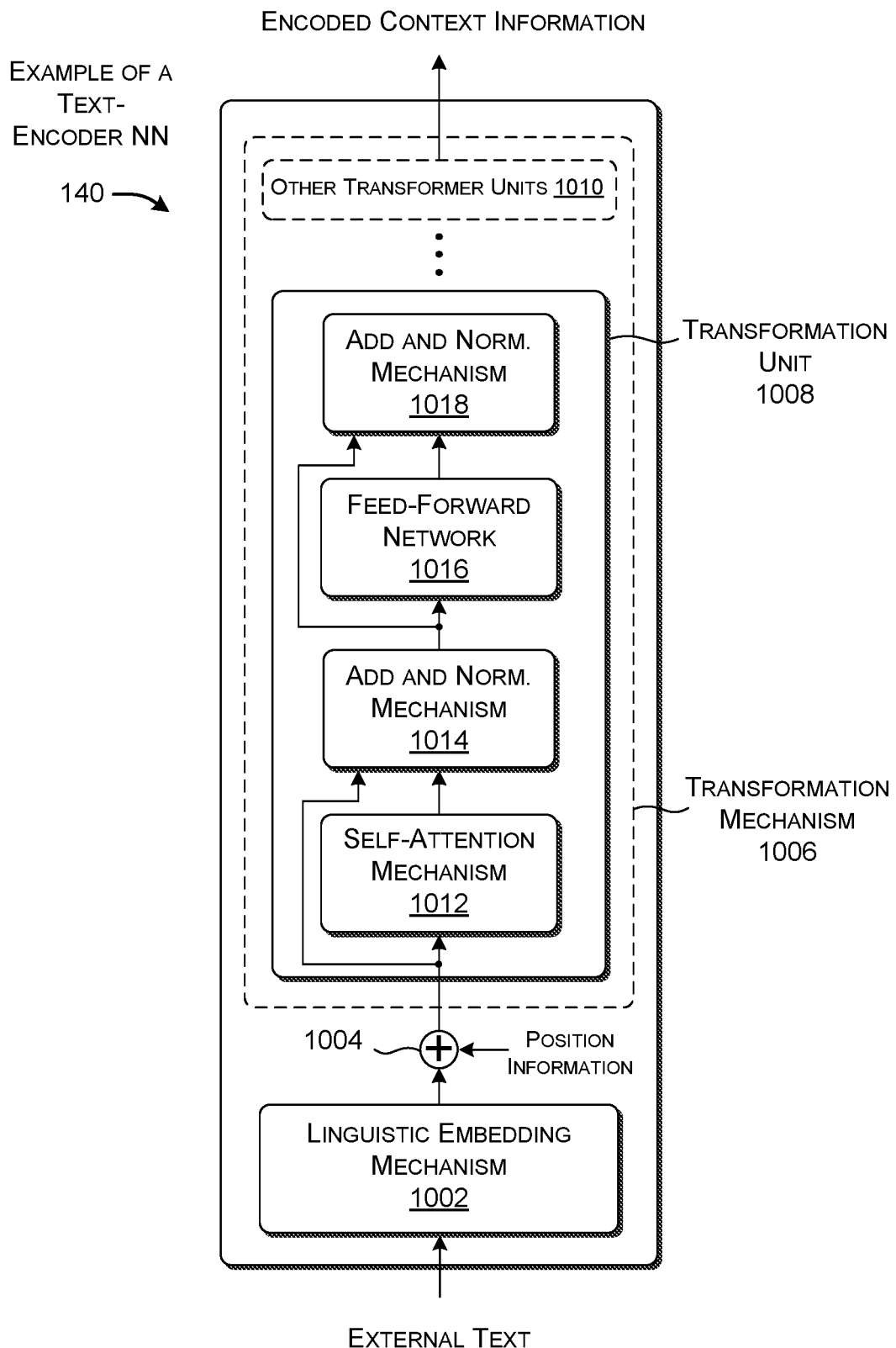
FIG. 10 shows one implementation of a text encoder neural network. The text encoder neural network transforms external text into encoded context information.

FIG. 10 shows one implementation of the text-encoder neural network ("text encoder" for brevity) 140. The text encoder 140 operates by mapping the external text 112 into encoded text information. From a high-level perspective, the text encoder 140 adopts a transformer-based architecture. Background information on the general topic of transformer-based architectures can be found in Devlin, et al., "BERT: Pre-training of Deep Bidirectional Transformers for Language Understanding," arXiv:1810.04805v2 [cs.CL], May 24, 2019, 16 pages, and Vaswani, et al., "Attention Is All You Need," arXiv:1706.03762v5 [cs.CL], Dec. 6, 2017, 15 pages. Other implementations can use text encoders that adopt other types of architectures. For example, another implementation can use a CNN or RNN to map the external text 112 to the encoded context information.

Starting at the bottom of FIG. 10, a linguistic embedding mechanism 1002 transforms the tokens in the external text 112 into a set of input embeddings, also referred to herein as input vectors. The linguistic embedding mechanism 1002 can use different techniques to perform this task. In one approach, the linguistic embedding mechanism 1002 can convert each word in the external text 112 into a vector representation, e.g., using a lookup table, neural network, etc. The linguistic embedding mechanism 1002 can also optionally add a special classification token "[cls]" to the beginning of the series of input embeddings.

Next, an adding mechanism 1004 adds position information to each input embedding. The position information describes the position of a token (associated with a particular input embedding) in the series of tokens that make up the external text 112. For example, assume that the external text 112 includes the title "hybrid Ford hatchback 2020." The adding mechanism 1004 will add position information to the input embedding associated with "hybrid" that indicates that the word "hybrid" is the first token in the external text 112. Overall, the text encoder 202 adds position information to the input embeddings to inform its self-attention mechanisms (described below) of the positional context of each token under consideration within the external text 112. The adding mechanism 1004 can encode position information in different ways, such as by using one or more sinusoidal functions to map the index of a token into position information, or by using a machine-trained function to map the index of the token into position information. Overall, the adding mechanism 1004 produces position-modified embeddings.

A transformation mechanism 1006 next maps the set of position-modified embeddings into transformer output vectors. The transformation mechanism 1006, in turn, includes a chain of one or more transformation units, including representative transformation unit 1008 and one or more other transformation units 1010. The representative transformation unit 1008 includes a series of layers, including a self-attention mechanism 1012, an add-and-normalize mechanism 1014, a feed-forward neural network 1016, and another add-and-normalize mechanism 1018.

The self-attention mechanism 1012 determines the significance of each token in the external text 112 to each other token. For example, assume that the given external text 112 includes a set of linguistic tokens, optionally with a preceding classification token "[cls]". In processing each particular word in external text 112, the self-attention mechanism 1012 takes into the consideration the relevance of each other word in the external text 112 on that particular word. For example, assume that the external text reads "What is the median sales price of this product in the city of Billings, Mont.?" In processing the word "Billings," the self-attention mechanism 216 may determine that the tokens "city" and "MT" are most useful in correctly disambiguating the term "Billing," e.g., because these contextual terms strongly suggest that "Billings" refers to a physical place rather than a financial term.

The self-attention mechanism 1012 can determine the above-described cross-term relevance by packing the position-modified embeddings into a single matrix X. The self-attention mechanism 1012 then linearly projects this matrix X into three matrices Q, K, V, corresponding to a query matrix, key matrix, and value matrix, respectively, where $d_k$ is the dimension of the queries and keys in Q and K, respectively. A dot-product mechanism computes attention based on the equation:

$$\text{Attention}(Q, K, V) = \text{softmax}\left(\frac{QK^T}{\sqrt{d_k}}\right)V.$$

The add-and-normalize mechanism 1014 adds the input to the self-attention mechanism 1012 (i.e., the position-modified input embeddings) to the output result of the self-attention mechanism 1012, and then performs layer-normalization on that sum. The feed-forward network 1016 uses a fully-connected (FC) feed-forward neural network having any number of layers to transform the output of the add-and-normalize mechanism 1014 into an output result. In one implementation, the feed-forward network 1016 can use linear transformations interspersed with activations (e.g., ReLU activations). Finally, another add-and-normalize mechanism 1018 adds the input that is fed to feed-forward network 1016 to the output result of the feed-forward network 1016, and then normalizes that sum.

In one implementation, the text encoder 140 can use the transformed counterpart of the [CLS] token (in the final output layer) as the encoded context information. In another implementation, the text encoder 140 case use the output of its entire final layer as the encoded context information. In the special case in which the electronic document 110 contains no external text 112, the text encoder 140 can provide default context information that conveys that fact.

FIG. 11 shows a training framework 1102 for producing models associated with any of the above-described neural networks. An example-producing system 1104 receives images from one or more sources 1106 of images. In some cases, the images are already annotated to show the locations of item name-related information therein. In other cases, the example-producing system 1104 can rely on a group of users to manually add these labels. The example-producing system 1104 can associate each labeled image with text information in different ways. In some cases, an image originates from an electronic document that includes a title and/or a caption, etc. associated with the image. The example-producing system 1104 can treat that information as external text associated with the image, if it exists. Alternatively, or in addition, the example-producing system 1104 can retrieve text from an online encyclopedia (e.g., Wikipedia) pertaining to an object depicted in the image (if known). The example-producing system 1104 can treat that information as external text associated with the image. In any event, the example-producing system 1104 can store all such information it obtains in a data store 1108. That information constitutes a set of training examples. One or more training systems 1110 produce trained models based on the training examples, e.g., using stochastic gradient descent or any other training technique(s).

B. Illustrative Processes

FIGS. 12-15 show processes that explain the operation of the item name identifier system 102 of Section A in flowchart form. Since the principles underlying the operation of the item name identifier system 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIGS. 12 and 13 together show a process 1202 that provides an overview of one illustrative manner of operation of the item name identifier system 102. The process 1202 may be performed, at least in part, using one or more neural networks. In block 1204, in response to a triggering event, the item name identifier system 102 receives an instruction to operate on an electronic document, the electronic document including at least an input image and external text, the external text appearing outside of the input image in the electronic document. In block 1206, the item name identifier system 102 parses the electronic document to identify the input image and the external text. In block 1208, the item name identifier system 102 identifies one or more candidate regions in the input image, each candidate region encompassing an object. In block 1302 (of FIG. 13), the item name identifier system 102 determines one or more target regions from among the one or more candidate regions. Each target region encompasses an object-of-interest and is associated with an item name. In some cases, the item name also directly and/or indirectly conveys an entity with which the target region is affiliated. Block 1302 also involves generating one or more instances of region-feature information respectively associated with the one or more target regions. In block 1304, the item name identifier system 102 converts intra-image text that appears in the input image into intra-image text information. In block 1306, the item name identifier system 102 converts the external text that appears outside the input image into encoded context information. In block 1308, the item name identifier system 102 determines an item name associated with a given target region based on given region-feature information associated with the given target region, the intra-image text information, and the encoded context information, to provide an identified item name.

Different applications can leverage the item name identified by the process 1202 of FIGS. 12 and 13. For example, in operation 5.5 of FIG. 5, the item name identifier system 102 identifies a supplemental content item that is associated with the identified item name. In operation 5.6 of FIG. 5, the item name identifier system 102 sends the supplemental content item to a user computing device over a computer network.

FIG. 14 shows a process 1402 that describes a first technique for performing the determining operation of block 1308 of FIG. 13. In block 1404, the item name identifier system 102 fuses the intra-image text information with the encoded context information to produce text fusion information. In block 1406, the item name identifier system 102 fuses the text fusion information with the given region-feature information associated with the given target region, to produce combined fusion information. In block 1408, the item name identifier system 102 determines the identified item name based on combined fusion information.

FIG. 15 shows a process 1502 that describes a second technique for performing the determining operation of block 1308 of FIG. 13. In block 1504, the item name identifier system 102 determines a first assessment of the identified item name based on the given region-feature information. In block 1506, the item name identifier system 102 determines a second assessment of the identified item name based on the intra-image text information. In block 1508, the item name identifier system determines a third assessment of the identified item name based on the encoded context information. In block 1510, the item name identifier system 102 determines a final assessment of the identified item name based on the first, second, and third assessments.

C. Representative Computing Functionality

Figure 16:
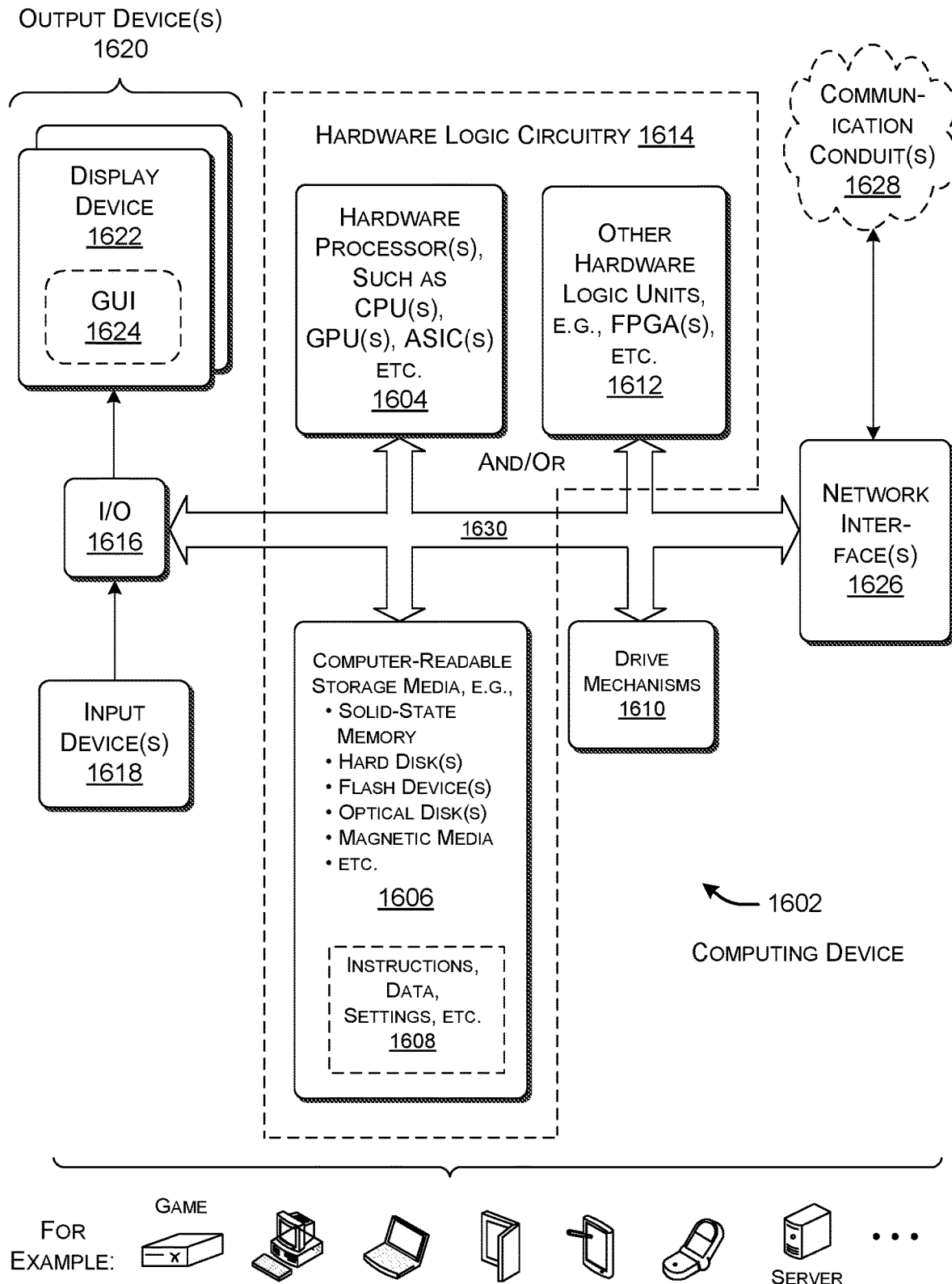
FIG. 16 shows an illustrative type of computing device that can be used to implement any aspect of the features shown in the foregoing drawings.

FIG. 16 shows a computing device 1602 that can be used to implement any aspect of the mechanisms set forth in the above-described figures. For instance, with reference to FIG. 3, the type of computing device 1602 shown in FIG. 16 can be used to implement any user computing device and any server. In all cases, the computing device 1602 represents a physical and tangible processing mechanism.

The computing device 1602 can include one or more hardware processors 1604. The hardware processor(s) 1604 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1602 can also include computer-readable storage media 1606, corresponding to one or more computer-readable media hardware units. The computer-readable storage media 1606 retains any kind of information 1608, such as machine-readable instructions, settings, data, etc. Without limitation, for instance, the computer-readable storage media 1606 may include one or more solid-state devices, one or more magnetic hard disks, one or more optical disks, magnetic tape, and so on. Any instance of the computer-readable storage media 1606 can use any technology for storing and retrieving information. Further, any instance of the computer-readable storage media 1606 may represent a fixed or removable unit of the computing device 1602. Further, any instance of the computer-readable storage media 1606 may provide volatile or non-volatile retention of information.

The computing device 1602 can utilize any instance of the computer-readable storage media 1606 in different ways. For example, any instance of the computer-readable storage media 1606 may represent a hardware memory unit (such as Random Access Memory (RAM)) for storing transient information during execution of a program by the computing device 1602, and/or a hardware storage unit (such as a hard disk) for retaining/archiving information on a more permanent basis. In the latter case, the computing device 1602 also includes one or more drive mechanisms 1610 (such as a hard drive mechanism) for storing and retrieving information from an instance of the computer-readable storage media 1606.

The computing device 1602 may perform any of the functions described above when the hardware processor(s) 1604 carry out computer-readable instructions stored in any instance of the computer-readable storage media 1606. For instance, the computing device 1602 may carry out computer-readable instructions to perform each block of the processes described in Section B.

Alternatively, or in addition, the computing device 1602 may rely on one or more other hardware logic units 1612 to perform operations using a task-specific collection of logic gates. For instance, the hardware logic unit(s) 1612 may include a fixed configuration of hardware logic gates, e.g., that are created and set at the time of manufacture, and thereafter unalterable. Alternatively, or in addition, the other hardware logic unit(s) 1612 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 16 generally indicates that hardware logic circuitry 1614 includes any combination of the hardware processor(s) 1604, the computer-readable storage media 1606, and/or the other hardware logic unit(s) 1612. That is, the computing device 1602 can employ any combination of the hardware processor(s) 1604 that execute machine-readable instructions provided in the computer-readable storage media 1606, and/or one or more other hardware logic unit(s) 1612 that perform operations using a fixed and/or programmable collection of hardware logic gates. More generally stated, the hardware logic circuitry 1614 corresponds to one or more hardware logic units of any type(s) that perform operations based on logic stored in and/or otherwise embodied in the hardware logic unit(s).

In some cases (e.g., in the case in which the computing device 1602 represents a user computing device), the computing device 1602 also includes an input/output interface 1616 for receiving various inputs (via input devices 1618), and for providing various outputs (via output devices 1620). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1622 and an associated graphical user interface presentation (GUI) 1624. The display device 1622 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1602 can also include one or more network interfaces 1626 for exchanging data with other devices via one or more communication conduits 1628. One or more communication buses 1630 communicatively couple the above-described units together.

The communication conduit(s) 1628 can be implemented in any manner, e.g., by a local area computer network, a wide area computer network (e.g., the Internet), point-to-point connections, etc., or any combination thereof. The communication conduit(s) 1628 can include any combination of hardwired links, wireless links, routers, gateway functionality, name servers, etc., governed by any protocol or combination of protocols.

FIG. 16 shows the computing device 1602 as being composed of a discrete collection of separate units. In some cases, the collection of units may correspond to discrete hardware units provided in a computing device chassis having any form factor. FIG. 16 shows illustrative form factors in its bottom portion. In other cases, the computing device 1602 can include a hardware logic unit that integrates the functions of two or more of the units shown in FIG. 1. For instance, the computing device 1602 can include a system on a chip (SoC or SOC), corresponding to an integrated circuit that combines the functions of two or more of the units shown in FIG. 16.

The following summary provides a non-exhaustive set of illustrative examples of the technology set forth herein.

According to a first example, a computer-implemented method is described for processing an input image, performed, at least in part, using one or more neural networks. The method includes: in response to a triggering event, receiving an instruction to operate on an electronic document, the electronic document including at least an input image and external text, the external text appearing outside of the input image in the electronic document; parsing the electronic document to identify the input image and the external text; identifying one or more candidate regions in the input image, each candidate region encompassing an object; using a first neural network to determine one or more target regions from among the one or more candidate regions, each target region encompassing an object-of-interest and being associated with an item name, the operation of determining the one or more target regions including generating one or more instances of region-feature information respectively associated with the one or more target regions; using optical character recognition to convert intra-image text that appears in the input image into intra-image text information; using a second neural network to convert the external text that appears outside the input image into encoded context information; determining a particular item name associated with a given target region based on given region-feature information associated with the given target region, the intra-image text information, and the encoded context information; identifying a supplemental content item that is associated with the particular item name; and sending the supplemental content item to a user computing device over a computer network.

According to a second example, the particular item name is associated with a particular brand, and wherein the given target region includes a logo associated with the particular brand.

According to a third example, for another case, an electronic document that is received includes no target region, and/or no intra-image text, and/or no external text, and the method includes generating default region-feature information for a case in which there is no target region, and/or generating default intra-image text information for a case in which there is no intra-image text, and/or generating default encoded context information for a case in which there is no external text.

According to a fourth example, the triggering event is an indication that a user has accessed the electronic document using the user computing device, or a determination that the electronic document is to be sent to the user computing device. The supplemental content item is presented to the user computing device as part of the electronic document.

According to a fifth example, the optical character recognition produces OCR output results, and wherein the converting of the intra-image text into the intra-image text information also includes encoding the OCR output results into the intra-image text information.

According to a sixth example, the operation of determining of the particular item name includes: fusing the intra-image text information with the encoded context information to produce text fusion information; fusing the text fusion information with the given region-feature information associated with the given target region, to produce combined fusion information; and determining the particular item name based on combined fusion information.

According to a seventh example, relating to the sixth example, the fusing of the intra-image text information with the encoded context information is performed by a third neural network, and the fusing of the text fusion information with the given region-feature information is performed by a fourth neural network.

According to an eighth example, the operation of determining of the particular item name includes: determining a first assessment of the particular item name based on the given region-feature information; determining a second assessment of the particular item name based on the intra-image text information; determining a third assessment of the particular item name based on the encoded context information; and determining a final assessment of the particular item name based on the first, second, and third assessments.

According to a ninth example, one or more computing devices for processing an input image is described. The computing device(s) include hardware logic circuitry, the hardware logic circuitry implementing at least one or more neural networks, the hardware logic circuitry being configured to implement a method that includes: in response to a triggering event, receiving an instruction to operate on an electronic document, the electronic document including at least an input image and external text, the external text appearing outside of the input image in the electronic document; parsing the electronic document to identify the input image and the external text; identifying one or more candidate regions in the input image, each candidate region encompassing an object; determining, using a first neural network provided by the hardware logic circuitry, one or more target regions from among the one or more candidate regions, each target region encompassing an object-of-interest and being associated with an item name, the operation of determining the one or more target regions including generating one or more instances of region-feature information respectively associated with the one or more target regions; converting intra-image text that appears in the input image into intra-image text information; converting, using a second neural network provided by the hardware logic circuitry, the external text that appears outside the input image into encoded context information; and determining a particular item name associated with a given target region based on given region-feature information associated with the given target region, the intra-image text information.

According to a tenth example, relating to the ninth example, the triggering event is an indication that a user has accessed the electronic document using a user computing device, or a determination that the electronic document is to be sent to the user computing device. The operations further include: identifying a supplemental content item that is associated with the particular item name; and sending the supplemental content item to the user computing device, the supplemental content item being presented to the user computing device as part of the electronic document.

According to an eleventh example, relating to the ninth example, the electronic document is a member of a set of electronic documents, and wherein the triggering event is an identification of a group of electronic documents to be processed, and wherein the operations further include identifying a distribution of item names within the set of electronic documents.

According to a twelfth example, relating to the ninth example, the triggering event is submission of the electronic document by a submitting entity, and wherein the operations include determining whether the particular item name is consistent with other information presented in the electronic document.

According to a thirteenth example, relating to the ninth example, the particular item name is associated with a particular brand, and wherein the given target region includes a logo associated with the particular brand.

According to a fourteenth example, relating to the ninth example, the converting of the intra-image text into the intra-image text information is performed, at least in part, by an optical character recognition component, the optical character recognition component being implemented by the hardware logic circuitry, the optical character recognition component producing OCR output results. Further, the converting of the external text into intra-image text information also includes encoding the OCR output results into the intra-image text information.

According to a fifteenth example, relating to the ninth example, the determining of the particular item name includes: fusing the intra-image text information with the encoded context information to produce text fusion information; fusing the text fusion information with the given region-feature information to produce combined fusion information; and determining the particular item name based on the combined fusion information.

According to a sixteenth example, relating to the fiftieth example, the fusing of the intra-image text information with the encoded context information is performed by a third neural network, the fusing of the text fusion information with the given region-feature information is performed by a fourth neural network, wherein the third and fourth neural networks are implemented by the hardware logic circuitry.

According to a seventeenth example, relating to the ninth example, the determining of the particular item name includes: determining a first assessment of the particular item name based on the given region-feature information; determining a second assessment of the particular item name based on the intra-image text information; determining a third assessment of the particular item name based on the encoded context information; and determining a final assessment of the particular item name based on the first, second, and third assessments.

According to an eighteenth example, a computer-readable storage medium for storing computer-readable instructions is described. The computer-readable instructions, when executed by one or more hardware processors, perform a method that includes: in response to a triggering event, receiving an instruction to operate on an electronic document, the electronic document including at least an input image and external text, the external text appearing outside of the input image; parsing the electronic document to identify the input image and the external text; identifying one or more candidate regions in the input image, each candidate region encompassing an object; determining one or more target regions from among the one or more candidate regions, each target region encompassing an object-of-interest and being associated with an item name, the operation of determining of the one or more target regions including generating one or more instances of region-feature information respectively associated with the one or more target regions; converting intra-image text that appears in the input image into intra-image text information; converting the external text that appears outside the input image into encoded context information; fusing the intra-image text information with the encoded context information to produce text fusion information; fusing the text fusion information with given region-feature information associated with a given target region, to produce combined fusion information; and determining a particular item name associated with the given target region based on combined fusion information.

According to a nineteenth example, relating to the eighteenth example, the triggering event is an indication that a user has accessed the electronic document using a user computing device, or a determination that the electronic document is to be sent to the user computing device.

According to a twentieth example, relating to the eighteenth example, the method is performed using one or more neural networks implemented by the computer-readable instructions.

A twenty-first aspect corresponds to any combination (e.g., any logically consistent permutation or subset) of the above-referenced first through twentieth examples.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first examples.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for processing an input image, performed, at least in part, using one or more neural networks, comprising:

in response to a triggering event, receiving an instruction to operate on an electronic document, the electronic document including at least an input image and external text, the external text appearing outside of the input image in the electronic document;

parsing the electronic document to identify the input image and the external text;

identifying one or more candidate regions in the input image, each candidate region encompassing an object;

using a first neural network to determine one or more target regions from among said one or more candidate regions, each target region encompassing an object-of-interest and being associated with an item name, said determining of said one or more target regions including generating one or more instances of region-feature information respectively associated with said one or more target regions;

using optical character recognition to convert intra-image text that appears in the input image into intra-image text information;

using a second neural network to convert the external text that appears outside the input image into encoded context information; and determining a particular item name associated with a given target region, corresponding to one of said one or more target regions, based on given region-feature information associated with the given target region, the intra-image text information, and the encoded context information, wherein said determining of the particular item name comprises:

fusing the intra-image text information with the encoded context information to produce text fusion information;

fusing the text fusion information with the given region-feature information associated with the given target region, to produce combined fusion information; and determining the particular item name based on the combined fusion information.

2. The method of claim 1, wherein the particular item name is associated with a particular brand, and wherein the given target region includes a logo associated with the particular brand.

3. The method of claim 1, wherein, for another case, an electronic document that is received includes no target region, and/or no intra-image text, and/or no external text, and the method includes generating default region-feature information for a case in which there is no target region, and/or generating default intra-image text information for a case in which there is no intra-image text, and/or generating default encoded context information for a case in which there is no external text.

4. The method of claim 1, wherein the triggering event is an indication that a user has accessed the electronic document using a user computing device, or a determination that the electronic document is to be sent to the user computing device, and wherein the supplemental content item is presented to the user computing device as part of the electronic document.

5. The method of claim 1, wherein the optical character recognition produces OCR output results, and wherein conversion of the intra-image text into the intra-image text information also includes encoding the OCR output results into the intra-image text information.

6. The method of claim 1, wherein said fusing of the intra-image text information with the encoded context information is performed by a third neural network, and wherein said fusing of the text fusion information with the given region-feature information is performed by a fourth neural network.

7. The method of claim 1, further comprising:

identifying a supplemental content item that is associated with the particular item name; and sending the supplemental content item to a user computing device over a computer network.

8. One or more computing devices for processing an input image, comprising:

hardware logic circuitry, the hardware logic circuitry implementing at least one or more neural networks, the hardware logic circuitry being configured to implement a method that includes:

in response to a triggering event, receiving an instruction to operate on an electronic document, the electronic document including at least an input image and external text, the external text appearing outside of the input image in the electronic document;

parsing the electronic document to identify the input image and the external text;

identifying one or more candidate regions in the input image, each candidate region encompassing an object;

determining, using a first neural network provided by the hardware logic circuitry, one or more target regions from among said one or more candidate regions, each target region encompassing an object-of-interest and being associated with an item name, said determining of said one or more target regions including generating one or more instances of region-feature information respectively associated with said one or more target regions;

converting intra-image text that appears in the input image into intra-image text information;

converting, using a second neural network provided by the hardware logic circuitry, the external text that appears outside the input image into encoded context information; and determining a particular item name associated with a given target region, corresponding to one of said one or more target regions, based on given region-feature information associated with the given target region, the intra-image text information, and the encoded context information, wherein said determining of the particular item name comprises:

fusing the intra-image text information with the encoded context information to produce text fusion information;

fusing the text fusion information with the given region-feature information to produce combined fusion information; and determining the particular item name based on the combined fusion information.

9. The one or more computing devices of claim 8, wherein the triggering event is an indication that a user has accessed the electronic document using a user computing device, or a determination that the electronic document is to be sent to the user computing device, and wherein the operations further include:
- identifying a supplemental content item that is associated with the particular item name; and
- sending the supplemental content item to the user computing device, the supplemental content item being presented to the user computing device as part of the electronic document.

10. The one or more computing devices of claim 8, wherein the electronic document is a member of a set of electronic documents, and wherein the triggering event is an identification of a group of electronic documents to be processed, and wherein the operations further include identifying a distribution of item names within the set of electronic documents.

11. The one or more computing devices of claim 8, wherein the triggering event is submission of the electronic document by a submitting entity, and wherein the operations include determining whether the particular item name is consistent with other information presented in the electronic document.

12. The one or more computing devices of claim 8, wherein the particular item name is associated with a particular brand, and wherein the given target region includes a logo associated with the particular brand.

13. The one or more computing devices of claim 8,
- wherein said converting of the intra-image text into the intra-image text information is performed, at least in part, by an optical character recognition component, the optical character recognition component being implemented by the hardware logic circuitry, the optical character recognition component producing OCR output results, and
- wherein said converting of the external text into intra-image text information also includes encoding the OCR output results into the intra-image text information.

14. The one or more computing devices of claim 1,
- wherein said fusing of the intra-image text information with the encoded context information is performed by a third neural network,
- wherein said fusing of the text fusion information with the given region-feature information is performed by a fourth neural network, the third and fourth neural networks being implemented by the hardware logic circuitry.

15. A computer-readable storage medium for storing computer-readable instructions, the computer-readable instructions, when executed by one or more hardware processors, performing a method that comprises:
- in response to a triggering event, receiving an instruction to operate on an electronic document, the electronic document including at least an input image and external text, the external text appearing outside of the input image;
- parsing the electronic document to identify the input image and the external text;
- identifying one or more candidate regions in the input image, each candidate region encompassing an object;
- determining one or more target regions from among said one or more candidate regions, each target region encompassing an object-of-interest and being associated with an item name,
- said determining of said one or more target regions including generating one or more instances of region-feature information respectively associated with said one or more target regions;
- converting intra-image text that appears in the input image into intra-image text information;
- converting the external text that appears outside the input image into encoded context information;
- fusing the intra-image text information with the encoded context information to produce text fusion information;
- fusing the text fusion information with given region-feature information associated with a given target region, corresponding to one of said one or more target regions, to produce combined fusion information; and
- determining a particular item name associated with the given target region based on the combined fusion information.

16. The computer-readable storage medium of claim 15, wherein the triggering event is an indication that a user has accessed the electronic document using a user computing device, or a determination that the electronic document is to be sent to the user computing device.

17. The computer-readable storage medium of claim 15, wherein the method is performed using one or more neural networks implemented by the computer-readable instructions.

* * * * *